United States Patent
Watson

(10) Patent No.: US 8,262,367 B2
(45) Date of Patent: Sep. 11, 2012

(54) FAULT-TOLERANT CHEMICAL INJECTION SYSTEM FOR OIL AND GAS WELLS

(75) Inventor: Richard R. Watson, Missouri City, TX (US)

(73) Assignee: National Coupling Company, Inc., Stafford, TX (US)

(*) Notice: Subject to any disclaimer, the term of this patent is extended or adjusted under 35 U.S.C. 154(b) by 891 days.

(21) Appl. No.: 12/324,079

(22) Filed: Nov. 26, 2008

(65) Prior Publication Data

US 2010/0126600 A1    May 27, 2010

(51) Int. Cl.
F04B 47/12    (2006.01)
(52) U.S. Cl. .......................................................... 417/60
(58) Field of Classification Search .................. 417/63, 417/60, 111, 115, 459, 495, 523, 525, 545, 417/546, 549, 256, 260, 311; 137/486, 487.5, 137/544; 222/249; 166/305.1, 90.1
See application file for complete search history.

(56) References Cited

U.S. PATENT DOCUMENTS

| | | | |
|---|---|---|---|
| 1,946,473 A | 2/1934 | Babendreer et al. | |
| 2,296,647 A * | 9/1942 | McCormick | 91/306 |
| 5,193,990 A | 3/1993 | Kamen et al. | |
| 6,006,953 A | 12/1999 | Newson et al. | |
| 6,026,847 A | 2/2000 | Reinicke et al. | |
| 6,973,936 B2 | 12/2005 | Watson | |
| 2003/0056955 A1 | 3/2003 | Watson | |
| 2006/0102355 A1 | 5/2006 | Ayres | |
| 2009/0114391 A1 | 5/2009 | Smith, IV et al. | |

FOREIGN PATENT DOCUMENTS

| | | |
|---|---|---|
| DE | 39 13 008 A1 | 10/1990 |
| GB | 1 560 191 | 1/1980 |
| GB | 2 391 859 A | 2/2004 |

* cited by examiner

*Primary Examiner* — Anh Mai
*Assistant Examiner* — Zachary J Snyder
(74) *Attorney, Agent, or Firm* — Wong, Cabello, Lutsch, Rutherford & Brucculeri, L.L.P.

(57) ABSTRACT

A metering body for a chemical injection system comprises a free piston having a pair of mechanically-actuated poppet valves which may individually open to permit fluid to pass from one side of the free piston to the other. The free piston slides within a cylinder having cylinder heads at opposing ends. Input/output ports are provided in the cylinder heads. In a preferred embodiment, the poppet valves have actuators that extend beyond the opposing faces of the free piston. If one face of the piston moves to within a predetermined distance of a cylinder head, the actuator contacts the cylinder head and further movement of the piston causes the corresponding poppet valve to open, permitting fluid to flow through the piston. In this way, a fault-tolerant system may be implemented. If a power interruption or other failure of the controller occurs, the system will continue to supply fluid at the most recently selected flow rate. When power is restored (or the fault is corrected), the controller causes a valve to reverse the flow of fluid through the metering body and the spring-loaded poppet valve will close as the free piston moves away from the cylinder head.

10 Claims, 3 Drawing Sheets

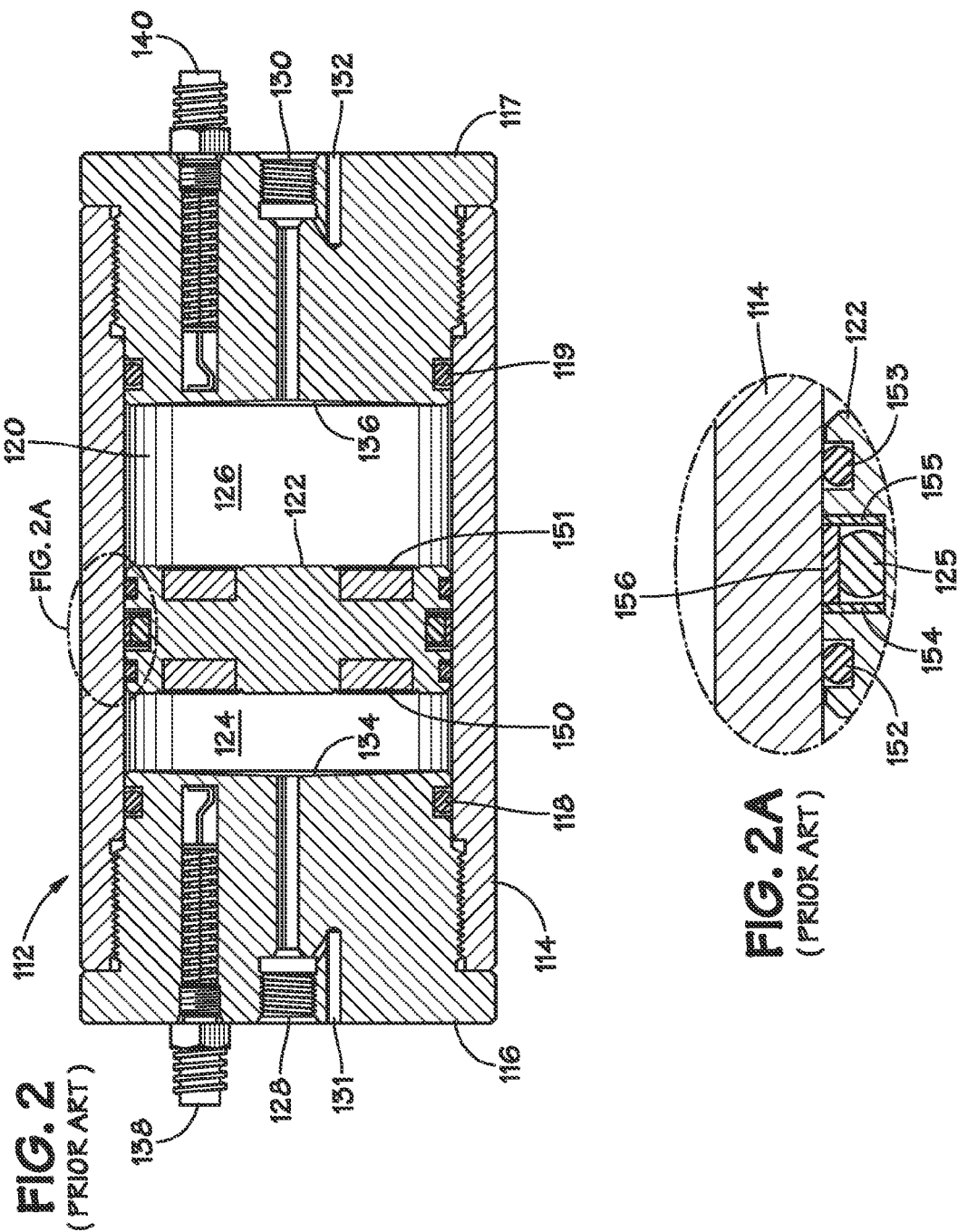

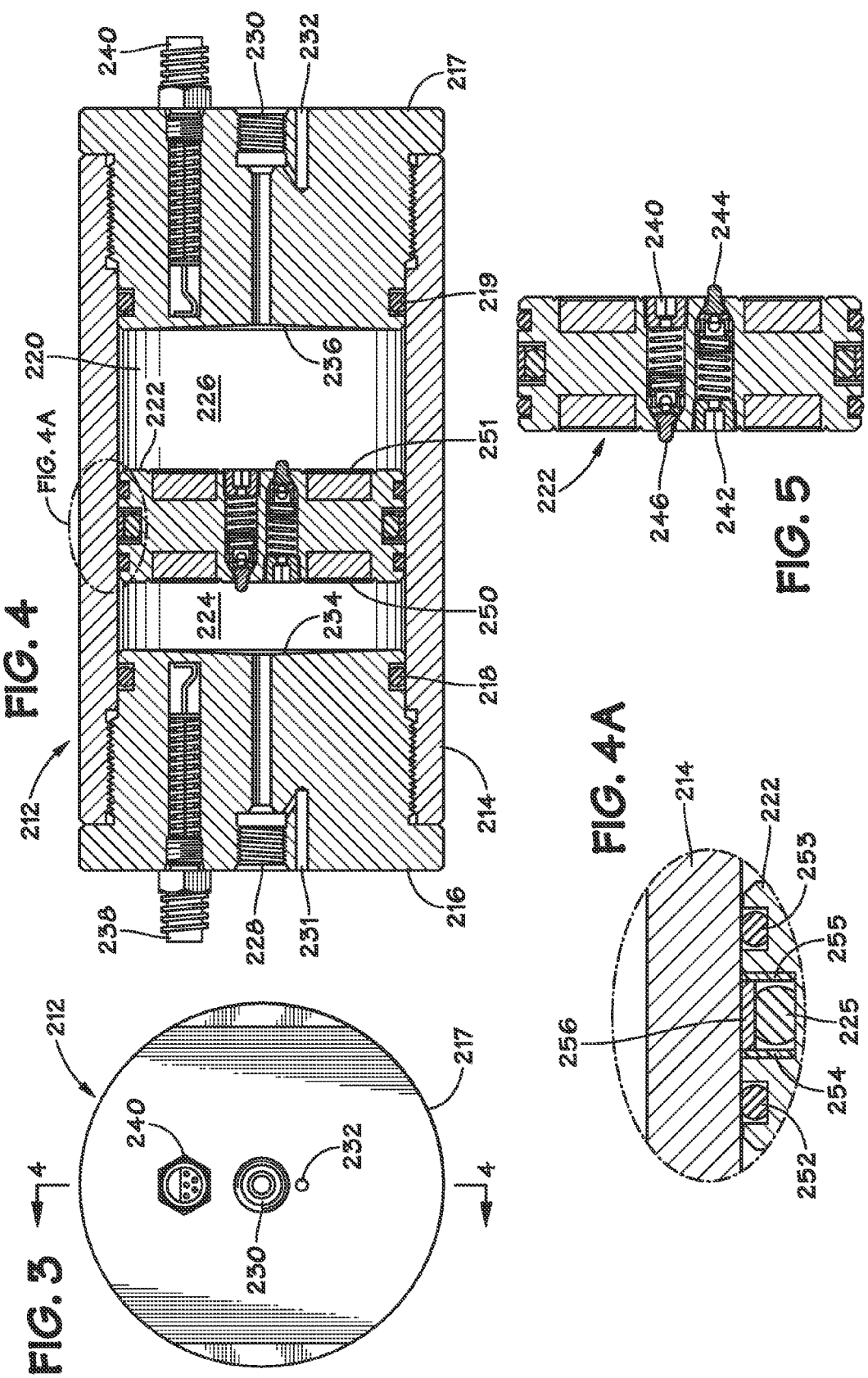

FAULT-TOLERANT CHEMICAL INJECTION SYSTEM FOR OIL AND GAS WELLS

CROSS-REFERENCE TO RELATED APPLICATIONS

None

STATEMENT REGARDING FEDERALLY SPONSORED RESEARCH OR DEVELOPMENT

None

BACKGROUND OF THE INVENTION

1. Field of the Invention

This invention relates to chemical injection systems for oil and gas wells. More particularly, it relates to a positive-displacement volumetric device for use in systems for injecting liquid-phase chemical treatment agents into undersea wells.

2. Description of the Related Art Including Information Disclosed Under 37 CFR 1.97 and 1.98

A variety of chemical agents are injected into hydrocarbon wells for the control of corrosion, hydrates, asphaltenes, paraffins, scale and the like. These chemical agents are typically in the liquid phase and are pumped into the well at a selected rate using a chemical injection system. For undersea wells, the chemical supply and pump may be located on a production platform and are most commonly connected to the wellhead via an umbilical line. If metering of the chemical agent is performed only at the surface, any leak in the umbilical or its connectors will give an erroneous indication of the quantity of chemical agent being injected into the well. Moreover, each subsea well may require its own injection system on the platform and connecting umbilical line.

Certain metering systems of the prior art employ a variable orifice—an adjustable orifice that allows remote control of flow at each well. Other metering systems of the prior art rely on pressure-compensated flow control—an adjustable pressure regulator and a fixed orifice can maintain a constant flow at each well.

Metering flow over a large range is often necessary over the life of the well. Orifice metering is limited in range and subject to filming, clogging and differing fluid properties.

Particulate contamination in long chemical injection lines is unavoidable and can clog the small orifices needed for metering and control. Filters on the lines are an added complication affecting system reliability, increasing capital costs and requiring periodic service (which increases operating costs).

U.S. Pat. No. 6,973,936 to Richard R. Watson (the disclosure of which is hereby incorporated by reference in its entirety) discloses a fluid injection system that controls the distribution of fluid from a supply line to a selected well at an adjustable rate. A free piston divides a cylinder into first and second chambers. A multi-position valve comprises a first position for passing fluid from the supply line into the first chamber to displace fluid from the second chamber back through the valve to an injection point, and a second position for passing fluid from the supply line to the second chamber to displace fluid from the first chamber back through the valve to the injection point. A control system in communication with a position sensor times displacement of the free piston to selected positions, and selectively adjusts a variable valve opening to adjust flow rate, switch between the first and second positions, and periodically increase the valve opening for cleaning.

The system disclosed in U.S. Pat. No. 6,973,936 may be characterized as a "fail closed" system—i.e., if power or control signals to the multi-position valve are interrupted, the system will continue to inject fluid into the well only until the free piston reaches the limit of its current stroke, at which point the flow of fluid will cease.

The present invention provides a "fail-as-is" state for a chemical injection system of the type disclosed in U.S. Pat. No. 6,973,936 in the event of a loss of power or control signals to the reversing valve. In a chemical injection system according to the invention, interruption of power or control signals to the valve results in a fluid flow rate substantially equal to the most-recently selected value. In this way, chemical treatment of the well can continue in the interim between the onset of the fault and its discovery and repair.

BRIEF SUMMARY OF THE INVENTION

A volumetric metering body to which the present invention may be applied comprises a displacement cylinder divided into two chambers by a free piston. Fluid to be metered enters a first chamber which causes the free piston to move in a direction which increases the volume of that chamber and decreases the volume of the second chamber. Fluid in the second chamber is displaced by the movement of the free piston and exits the metering body. Since the chambers have known dimensions, a known volume of fluid (which may be injected into a well) is dispensed with each cycle of the free piston.

In a metering body according to the present invention, the free piston is provided with two, mechanically-actuated valves which may be poppet valves. When open, the poppet valves permit fluid to flow from one side of the free piston to the other—i.e., fluid may flow from one chamber of the displacement cylinder to the other chamber. During normal operation of the metering body, the valves remain closed. However, if a fault occurs in the system which prevents the flow of fluid in the metering body to reverse at the end of the piston's stroke, at least one of the valves will open when the free piston comes within a preselected distance from a mechanical stop. In one particular preferred embodiment, the interior face of a cylinder head comprises the mechanical stop. With the valve open, pressurized fluid can continue to flow through the metering body at the last selected flow rate. In this way, a fault-tolerant system may be provided.

BRIEF DESCRIPTION OF THE SEVERAL VIEWS OF THE DRAWING(S)

FIG. 2 is a cross-sectional view of a displacement cylinder according to the prior art.

FIG. 2A is an enlarged view of the portion indicated in FIG. 2.

FIG. 3 is an end view of a displacement cylinder according to the invention.

FIG. 4 is a cross-sectional view of the displacement cylinder shown in FIG. 3 taken along line 4-4.

FIG. 4A is an enlarged view of the portion indicated in FIG. 4.

FIG. 5 is a cross-sectional view of a free piston according to the invention.

DETAILED DESCRIPTION OF THE INVENTION

Figure 1:
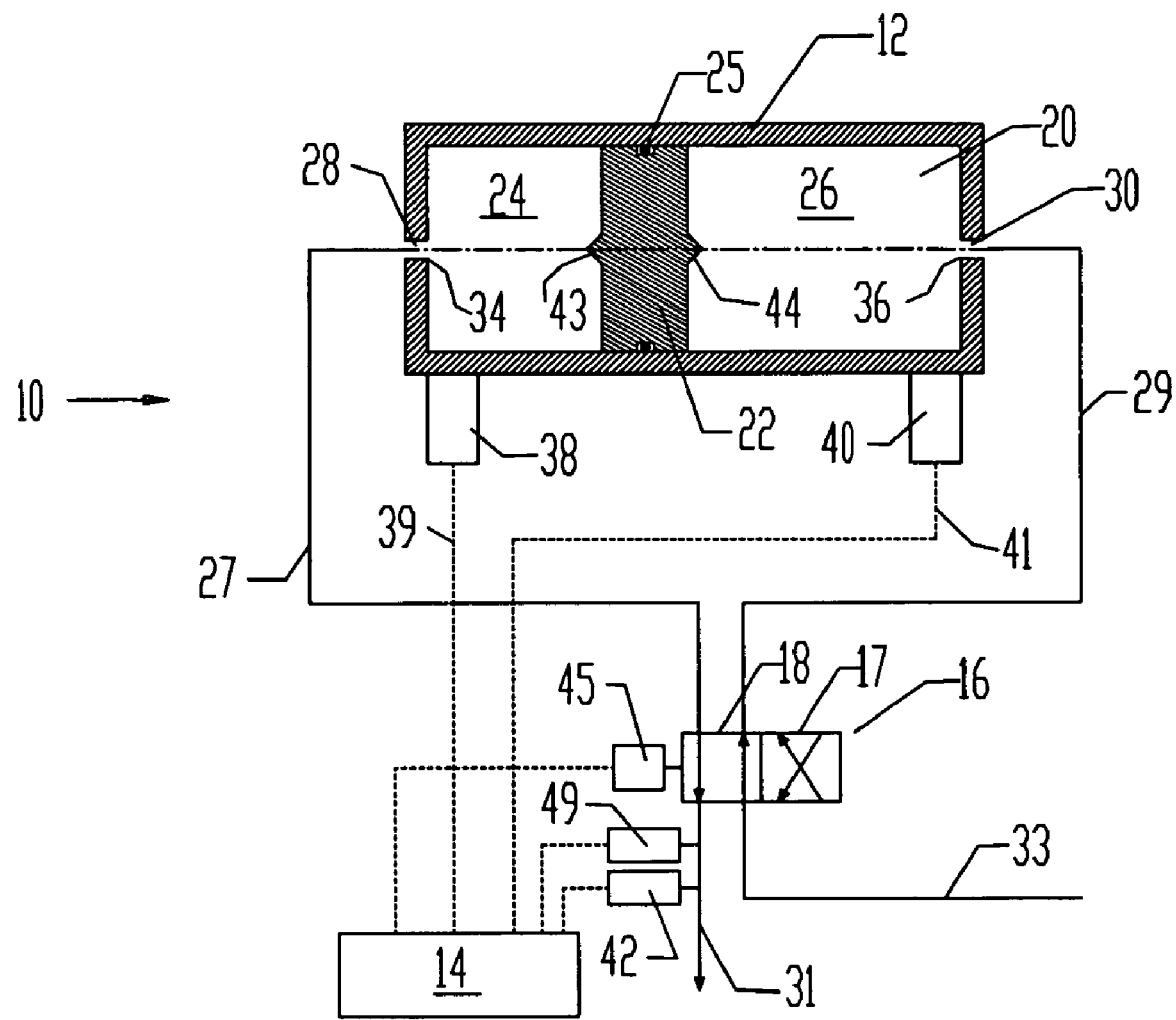
FIG. 1 is a schematic diagram of a chemical injection system of the prior art which comprises a displacement cylinder for measuring the volume of fluid injected.

FIG. 1 schematically illustrates details of a metering body 12 interconnected with a control system 14 and a multi-position valve 16 in a chemical injection system 10. The metering body 12 has a bore 20 for containing chemical fluid to be delivered to a well. An axially movable free piston 22 in bore 20 divides metering body 12 into variable-volume first and second chambers 24, 26. Free piston 22 seals with metering body 12 with a sealing member such as O-ring 25. Metering body 12 and free piston 22 conventionally comprise a cylinder and piston assembly, as shown. First and second input-output ports 28, 30 are provided for passing fluid into and out of first and second chambers 24, 26. Supply line 33 supplies chemical fluids at high pressure through multi-position valve 16 to metering body 12.

In a first valve position shown in FIG. 1, illustrated conceptually by alignment of parallel line segments 18 with lines 31 and 33, fluid passes from supply line 33, through multi-position valve 16, line 29, and input-output port 30, and into chamber 26. As fluid passes into chamber 26, fluid pressure urges free piston 26 toward end 34 of metering body 12, decreasing the volume of first chamber 24 and displacing the fluid out through input-output port 28. Fluid exiting port 28 passes through line 27, back through valve 16, and out through line 31 to an injection point in the well.

In a second position (not shown), which may be visualized conceptually by sliding the crossed flow lines 15 in valve 16 to the left to align with lines 31 and 33, fluid passes from supply line 33, through multi-position valve 16, line 27, input-output port 28, and into chamber 24. As fluid passes into chamber 24, fluid pressure urges free piston 26 toward end 36 of metering body 12, decreasing the volume of chamber 26 and displacing the fluid out through input-output port 30. Fluid exiting port 30 passes through line 29, back through valve 16, and out through line 31 to the same injection point in the well. Thus, by reversing the direction of multi-function valve 16 each time free piston 22 reaches a selected position, the fluid may be continually passed from line 33 to line 31 to the injection point in the well.

Position sensors 38 and 40 are included for sensing the position of free piston 22. Position sensors 38, 40 are in communication with control system 14 as represented by dashed lines 39, 41 through conventional means, such as by wire, optical fiber or wireless signal. When free piston 22 reaches selected positions, position sensors 38, 40 signals control system 14, in response to which control system 14 may selectively reverse the position of multi-position valve 16 to reverse the direction of free piston 22.

Because the selected positions are known, relative displacement of free piston 22 is also known, corresponding to a known volumetric displacement of fluid from metering body 12, computed as the product of displacement of free piston 22 and cross-sectional area of bore 20. The control system 14 includes an internal timer for timing displacement of free piston 22 between the selected positions, as signaled by position sensors 38, 40. A volumetric flow rate is therefore also known, which may be computed as the volumetric displacement divided by displacement time. The multi-position valve 16 includes a variable valve opening discussed below in conjunction with FIGS. 2-4, for controlling flow between supply line 33 and metering body 12. The control system 14 selectively adjusts the variable valve opening in response to displacement time of free piston 22. If the displacement time is too long, indicating a flow rate less than a desired flow rate, control system 14 may increase the variable valve opening to increase the flow rate. Conversely, if the displacement time is too short, indicating a flow rate more than the desired flow rate, control system 14 may selectively decrease the valve opening to reduce the flow rate. The flow rate of the fluid delivery to the well is thereby controlled.

As shown in FIG. 1, the selected positions of free piston 22 are preferably the positions of free piston 22 having reached either end 34, 36 of metering body 12. The selected positions of free piston 22 could alternatively be anywhere along the range of travel of free piston 22, and need not be at ends 34, 36 of metering body 12. In typical embodiments, as illustrated, position sensors 38, 40 are at substantially the same axial position as the selected positions. Conventional position sensors such as spring-loaded pins or magnetic or infrared proximity sensors may be used. In other embodiments, the position sensors conceivably may not need to be axially aligned with the selected positions. A position sensor may further comprise an optional pressure transducer 49 or a flow transducer 42. These types of position sensors may sense position implicitly, such as when there is a sudden drop of pressure in line 31 as the free piston reaches ends 34, 36 of metering body 12. Optional port valves such as might comprise sealing members 43, 44 on free piston 22 may be included for sealing input-output ports 28, 30 when free piston reaches ends 34, 36. This may more dramatically decrease pressure in line 31, and thereby provide a more distinct indication that free piston 22 has reached the end of its travel. Such an indication may provide a backup to confirm or substitute for position sensors 38 and 40.

Hall effect devices used in motion sensing and motion limit switches can offer enhanced reliability in extreme environments. As there are no moving parts involved within the sensor or magnet, typical life expectancy is improved compared to traditional electromechanical switches. Additionally, the sensor and magnet may be encapsulated in an appropriate protective material. Hall effect devices when appropriately packaged are immune to dust, dirt, mud, and water. These characteristics make Hall effect devices particularly preferred in a system according to the present invention for piston position sensing compared to alternative means such as optical and electromechanical sensing.

If the displacement cylinder fails to stroke in the expected time, a condition that indicates clogging, the controller can drive the 4-way valve to the full open position to allow debris to pass.

FIG. 2 shows a metering body 112 of the prior art. Metering body 112 comprises a cylinder 114 having bore 120 and capped at opposing ends by cylinder heads 116 and 117 which may be in treaded engagement with cylinder 114. Seals 118 and 119 may be provided to ensure a fluid-tight seal between cylinder 114 and cylinder heads 116 and 117, respectively. In one particular preferred embodiment, seals 118 and 119 are O-ring seals.

Piston 122 slides within bore 120 between end 134 of cylinder head 116 and end 136 of cylinder head 117. Piston 122 divides bore 120 into variable displacement chambers 124 and 126. As may be more clearly seen in the enlarged view of FIG. 2A, piston 122 may comprise one or more seals on its outer circumference for sealing to the inner wall of cylinder 114. In the particular metering body illustrated in FIG. 2, the sealing members comprise primary O-ring seal 125 at the centerline of piston 122 and flanking backup O-ring seals 152 and 153. Additionally, supplementary radial seals 154 and 155 and supplementary circumferential seal 156 may be provided. In one particular preferred embodiment, O-ring seals 125, 152 and 153 are fabricated using an elastomeric polymer and supplementary seals 154, 153 and 156 are fabricated from polyetheretherketone (PEEK), a semi-crystalline thermoplastic material.

The opposing faces of piston 122 may have ring-shaped magnets 150 and 151 embedded therein for actuating position sensors 138 and 140 in cylinder heads 116 and 117, respectively, as described below.

In operation, fluid enters and exits chamber 124 via first input/output port 128 and fluid enters and exits chamber 126 via second input/output port 130. Ports 128 and 130 may be in fluid communication with optional bleed ports 131 and 132, respectively. Bleed ports 131 and 132 may be provided in order to give operators a visual indication of a leaking connection at ports 128 and 130, respectively.

Position sensors 138 and 140 may be located within cylinder heads 116 and 117, respectively. In the metering body illustrated in FIG. 2, the position sensors 138 and 140 comprise Hall-effect switches which are spring-biased against the bottom of a blind hole in the cylinder head. As piston 122 approaches face 134 of cylinder head 116, magnet 150 actuates the Hall-effect switch of position sensor 138 which signals the controller (14 in FIG. 1) that piston 122 is at the end of a stroke. Likewise, as piston 122 approaches face 136 of cylinder head 117, magnet 151 actuates the Hall-effect switch of position sensor 140 which signals the controller (14 in FIG. 1) that piston 122 is at the end of the opposing stroke.

When piston 122 is sufficiently close to face 134 of cylinder head 116 to actuate position sensor 138, controller 14 (see FIG. 1) may signal actuator 45 to position valve 16 such that fluid, under pressure, is admitted to chamber 124 by way of I/O port 128. The fluid pressure in chamber 124 acts to urge free piston 122 towards face 136 of cylinder head 117 which displaces fluid within chamber 126 said fluid exiting metering body 112 via I/O port 130. This action continues until free piston 122 is sufficiently close to face 136 to actuate position sensor 140 at which point controller 14 signals valve actuator 45 to supply fluid under pressure to I/O port 130 and exhaust fluid via I/O port 128. The process then repeats with fluid being dispensed from port 128. The volume of fluid displaced by a full stroke of free piston 126 is a known quantity—either by calculation or empirical measurement. Thus, each time piston 122 completes a stroke (as determined by deactivation of one position sensor followed by actuation of the opposite position sensor), a known volume of fluid has been dispensed by metering body 112.

It will be appreciated by those skilled in the art that the above-described system may be characterized as a "fail-closed system"—i.e., in the event of a failure of controller 14, valve actuator 45 or valve 16, the system would dispense fluid until piston 122 reached the end of its current stroke (assuming a continuing supply of fluid to the inlet) at which point the flow of fluid would cease. Without piston movement, metering body 112 acts as a closed valve, interrupting the flow of fluid. Inasmuch as controller 14 and valve actuator 45 require power in order to operate, an interruption of power to the system will cause the flow of fluid to cease, even if a pressurized source of fluid remains available.

Referring now to FIG. 4, a metering body 212 according to the present invention is shown in cross section. Metering body 212 comprises a cylinder 214 having bore 220 and capped at opposing ends by cylinder heads 216 and 217 which may be in treaded engagement with cylinder 214. Seals 218 and 219 may be provided to ensure a fluid-tight seal between cylinder 214 and cylinder heads 216 and 217, respectively. In one particular preferred embodiment, seals 218 and 219 are O-ring seals.

Piston 222 slides within bore 220 between end 234 of cylinder head 216 and end 236 of cylinder head 217. Ends 234 and 236 may be concave. Piston 222 divides bore 220 into variable displacement chambers 224 and 226. As may be more clearly seen in FIG. 4A, piston 222 may comprise one or more seals on its outer circumference for sealing to the inner wall of cylinder 214. In the particular preferred embodiment illustrated in FIG. 4, the sealing members comprise primary O-ring seal 225 at the centerline of piston 222 and flanking backup O-ring seals 252 and 253. Additionally, supplementary radial seals 254 and 255 and supplementary circumferential seal 256 may be provided. In one particular preferred embodiment, O-ring seals 225, 252 and 253 are fabricated using an elastomeric polymer and supplementary seals 254, 253 and 256 are fabricated from polyetheretherketone (PEEK), a semi-crystalline thermoplastic material.

The opposing faces of piston 222 may have ring-shaped magnets 250 and 251 embedded therein for actuating position sensors 238 and 240 in cylinder heads 216 and 217, respectively, as described below.

In operation, fluid enters and exits chamber 224 via first input/output port 228 and fluid enters and exits chamber 226 via second input/output port 230. Ports 228 and 230 may be in fluid communication with optional bleed ports 231 and 232, respectively. Bleed ports 231 and 232 may be provided in order to give operators a visual indication of a leaking connection at ports 228 and 230, respectively.

Position sensors 238 and 240 may be located within cylinder heads 216 and 217, respectively. In the embodiment illustrated in FIG. 4, the position sensors 238 and 240 comprise Hall-effect switches which are spring-biased against the bottom of a blind hole in the cylinder head. As piston 222 approaches face 234 of cylinder head 216, magnet 250 actuates the Hall-effect switch of position sensor 238 which signals the controller (14 in FIG. 1) that piston 222 is at the end of a stroke. Likewise, as piston 222 approaches face 236 of cylinder head 217, magnet 251 actuates the Hall-effect switch of position sensor 240 which signals the controller (14 in FIG. 1) that piston 222 is at the end of the opposing stroke.

When piston 222 is sufficiently close to face 234 of cylinder head 216 to actuate position sensor 238, controller 14 (see FIG. 1) may signal actuator 45 to position valve 16 such that fluid, under pressure, is admitted to chamber 224 by way of I/O port 228. The fluid pressure in chamber 224 acts to urge free piston 222 towards face 236 of cylinder head 217 which displaces fluid within chamber 226 said fluid exiting metering body 212 via I/O port 230. This action continues until free piston 222 is sufficiently close to face 236 to actuate position sensor 240 at which point controller 14 signals valve actuator 45 to supply fluid under pressure to I/O port 230 and exhaust fluid via I/O port 228. The process then repeats with fluid being dispensed from port 228. The volume of fluid displaced by a full stroke of free piston 226 is a known quantity—either by calculation or empirical measurement. Thus, each time piston 222 completes a stroke (as determined by deactivation of one position sensor followed by actuation of the opposite position sensor), a known volume of fluid has been dispensed by metering body 212.

Piston 222 comprises a first passageway connecting the opposing faces of the generally cylindrical piston and a second passageway which also connected the opposing faces of the piston. Each passageway is closed by a valve 240, 242. In the embodiment illustrated in FIGS. 4 and 5, the valves 240 and 242 are spring-loaded poppet valves and are disposed in opposite directions. Valves 240, 242 comprise mechanical valve actuators 244 and 246, respectively, which project from the face of piston 222 and which cause their respective valves to open against the force of the valve spring when depressed.

If, for any reason, there is a failure of either or both position sensors 238, 240 or a failure of the valve actuator 45 or of controller 14, piston 222 will continue to be driven towards one of the cylinder head faces 234, 236. For the purposes of this discussion, it will be assumed that a failure in one of the above-referenced components or a power interruption occurs while fluid is being admitted into chamber 226 of metering body 212 via port 230 and fluid is being dispensed from port 228 as fluid is displaced from chamber 224.

When the advancing face of piston 222 moves sufficiently close to surface 234 to achieve contact between surface 234 and valve actuator 246, further movement of piston 222 in that direction will cause valve 240 to open, permitting fluid to flow from chamber 226 through valve 240 in piston 222, into chamber 224 and out via port 228. If the face of piston 222 is generally planar, concave surface 234 will prevent piston 222 from blocking the interior end of port 228—i.e., chamber 224 will at all times have a sufficient volume to permit the flow of fluid to continue through it.

In certain embodiments, the force constant of the valve springs may be chosen to allow the valve to open if the fluid pressure differential across the piston 222 exceeds the nominal working pressure of the metering body. In this way, an additional fluid passage through the piston may be opened if the reciprocating movement of the piston is interrupted.

It will be appreciated by those skilled in the art that the above-described system may be characterized as a "fail-as-is system"—i.e., in the event of a failure of controller 14, valve actuator 45 or valve 16, the system would continue to dispense fluid at the most recently selected flow rate (assuming no movement of valve 16). Inasmuch as controller 14 and valve actuator 45 require power in order to operate, an interruption of power to the system will not cause the flow of fluid to cease so long as a pressurized source of fluid remains available.

It will also be appreciated by those skilled in the art that a metering body 112 of the prior art may be retrofitted to practice the present invention by replacing piston 122 with a piston 222 as shown in FIG. 5.

Although the invention has been described in detail with reference to certain preferred embodiments, variations and modifications exist within the scope and spirit of the invention as described and defined in the following claims.

What is claimed is:

1. A volumetric fluid metering body comprising:
a cylinder having a first end, an opposing second end, and a central axial bore;
a first cylinder head at the first end of the cylinder;
a second cylinder head at the second end of the cylinder;
a piston which slides within the central axial bore and divides the bore into a first chamber and a second chamber the respective volumes of which change as the piston slides within the bore;
a first valve in the piston which is configured to open when the piston moves to within a preselected distance from the first cylinder head and when open permits fluid to flow through the piston from the first chamber to the second chamber; and,
a second valve in the piston which is configured to open when the piston moves to within a preselected distance from the second cylinder head and when open permits fluid to flow through the piston from the second chamber to the first chamber.

2. A volumetric fluid metering body as recited in claim 1 further comprising a concave surface on the interior face of the first and second cylinder heads.

3. A volumetric fluid metering body as recited in claim 1 wherein the first valve and the second valve are spring-loaded poppet valves.

4. A volumetric fluid metering body as recited in claim 3 wherein the spring-loaded poppet valves have a force constant which allows the valve to open if the fluid pressure exceeds a preselected value.

5. A volumetric fluid metering body as recited in claim 3 wherein the poppet valves comprise valve actuators which project from the face of the piston.

6. A volumetric fluid metering body as recited in claim 5 further comprising at least one position sensor which is responsive to the distance between at least one cylinder head and the piston and wherein the valve actuators are sized and configured such that the position sensor can detect the proximity of the piston at a distance between the advancing face of the piston and the interior face of the cylinder head which is greater than the distance that the valve actuators project from the face of the piston.

7. A free piston for a volumetric metering body comprising:
a generally cylindrical body having a first face and a second, opposing face;
a first fluid passageway between the first face and the second face;
a second fluid passageway between the first face and the second face;
a first valve which when open allows fluid to flow through the first fluid passageway and when closed prevents the flow of fluid through the first fluid passageway;
a second valve which when open allows fluid to flow through the second fluid passageway and when closed prevents the flow of fluid through the second fluid passageway;
a first valve actuator connected to the first valve which projects from the first face and is configured to open the first valve when the first face moves to within a pre-selected distance from another surface;
a second valve actuator connected to the second valve which projects from the second face and is configured to open the second valve when the second face moves to within a pre-selected distance from another surface.

8. A free piston as recited in claim 7 wherein the first and second valves are poppet valves.

9. A free piston as recited in claim 8 wherein the first and second valves are spring-loaded poppet valves.

10. A free piston as recited in claim 9 wherein the spring in the first valve has a force constant that permits the first poppet valve to open if the fluid pressure on first face of the piston exceeds the fluid pressure on the second face of the piston by an amount that is greater than the nominal operating pressure of the metering body.

* * * * *